Aug. 15, 1933.   A. H. CANDEE   1,922,757

METHOD OF AND MEANS FOR PRODUCING GEARS

Filed Oct. 6, 1931

INVENTOR
Allan H. Candee
BY
his ATTORNEY

Patented Aug. 15, 1933

1,922,757

UNITED STATES PATENT OFFICE 1,922,757

METHOD OF AND MEANS FOR PRODUCING GEARS

Allan H. Candee, Rochester, N. Y., assignor to Gleason Works, Rochester, N. Y., a Corporation of New York Application October 6, 1931. Serial No. 567,239

6 Claims. (Cl. 90—9)

The present invention relates to the art of generating irregular gears and particularly to the art of generating eccentric or approximately elliptical gears.

The present invention is an improvement over the invention disclosed in my pending application Serial No. 415,422, filed December 20, 1929. The primary purpose of the present invention is to improve the generating process previously disclosed so that the tooth shapes at various positions around an eccentric gear can be made more nearly uniform, particularly as regards the pressure angle of the profiles, and the tendency to undercut on certain teeth can be avoided. The present invention makes it possible to produce better eccentric gears while increasing the range of use of such gears, as this invention makes it possible to cut gears of greater eccentricity and smaller tooth numbers than could be cut practically by my prior process.

In my prior application I have disclosed a method of generating eccentric gears with a gear-shaped cutter which is mounted eccentrically so as to have, as it rotates, a movement toward and from the blank, and in which the gear is generated by reciprocating the cutter across the face of the blank while rotating the blank and cutter together at a constant velocity ratio. While this prior process is successful in achieving its object, its range of practical use is somewhat restricted. The teeth vary considerably in shape around a gear cut according to the process and with small tooth numbers and low pressure angles, undercut is liable to occur on some of the teeth.

In practicing the present invention, I again preferably use a gear-shaped cutter and again preferably mount this cutter eccentrically on the tool spindle. As before, the generating operation is effected by reciprocation and rotation of the cutter in engagement with the continuously rotating blank, but with the improved method, a periodic variation is introduced in the relative velocity ratio, preferably on the cutter. The non-uniform rotational movement of the cutter is so controlled that teeth of more nearly uniform thickness, shape, and pressure angle are generated on the blank. Due to this characteristic of substantial uniformity of tooth shape, gears to run with considerably more eccentricity and with more nearly uniform amounts of tooth contact in all positions can be cut with the method of the present invention than according to my prior process. The limiting factor on the prior process, viz. the danger of undercut causing weakness of teeth and loss of contact and due to the fact that some teeth will always be of much smaller pressure angle than others, is eliminated.

As before, in cutting gears of slight eccentricity, cylindrical blanks may be used, but where the gears are to run on axes considerably eccentric of their axes of generation, the blanks used will be of generally elliptical shape. As before, too, the cutter employed will have preferably a number of teeth which are a factor of the number of teeth in the gear to be cut and will be rotated on its axis at a rate such that the number of revolutions of the cutter for each revolution of the blank will be in the inverse ratio of their tooth numbers. Thus, because of the eccentric mounting of the cutter, the cutter will be moved bodily toward and from the blank an integral number of times in each revolution of the blank.

The principal objects of the present invention have already been described. Other objects will be apparent hereinafter from the specification and from the recital of the appended claims.

Figure 1:
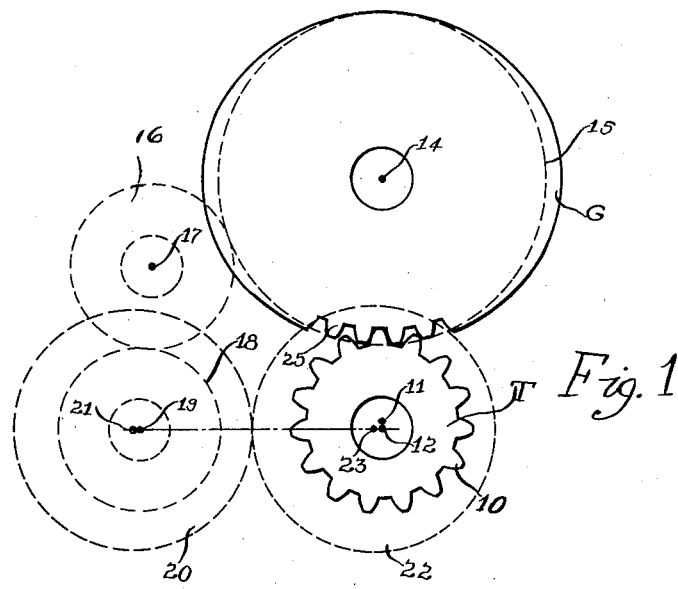
Figure 1 is a diagrammatic view illustrating the principles underlying the generation of eccentric gears according to the present inventin.

Referring first to Figure 1, T designates the cutter and G the gear blank to be generated. As shown, this blank is of generally elliptical shape. The cutter may be of the type generally employed in gear-shapers for generating spur gears, that is, it will have cutting teeth 10 of uniform size and shape, uniformly spaced about a common center 11 and the cutting teeth will be relieved back of their front face to cut on axial movement of the cutter in one direction.

The cutter is mounted to rotate about an axis 12 eccentric of its geometric center 11. The blank G is mounted to rotate about an axis 14 constituting an axis of generation but different from the axis on which the gear will be mounted when it runs in mesh with a mate gear. The two axes about which cutter and blank rotate are fixed during generation.

In use, the cutter is reciprocated across the face of the blank, cutting during its stroke in one direction and being withdrawn from cutting position on the return stroke. As the cutter reciprocates, the cutter and blank are rotated together in timed relation but at a periodically varying velocity ratio. So, as illustrated diagrammatically in Figure 1, the blank and cutter may be connected to rotate together in timed relation by a train of gearing comprising a spur gear 15 mounted coaxially with the blank G, a spur gear 16 meshing therewith and rotating about an axis 17, a spur gear 18 meshing with the spur gear 16 and rotating about an axis 19, an eccentric or elliptical gear 20 secured to rotate with the gear 18 about the axis 19 which is eccentric of its geometrical center 21, and an eccentric or elliptical gear 22 secured to rotate with the cutter T about the axis 12 which is eccentric of the geometrical center 23 of the gear 22. Because of the eccentric gears 20 and 22 in the train, the blank and cutter rotate together but at a periodically varying velocity ratio.

As the tool and blank rotate together through the gear drive just described, the cutter is moved bodily toward and away from the gear due to the fact that the geometric center 11 of the cutter is eccentric of its axis of rotation 12. This bodily movement of the cutter toward and away from the blank causes the cutter to follow the desired noncircular contour of the blank and to generate the teeth on the blank, as required, at different radial distances from the axis. It is to be noted, however, that the distance between the axes 12 and 14 of rotation of cutter and blank, respectively, remains fixed during generation. Through the eccentric mounting of the cutter a great simplification can be effected in structure of machines for generating non-circular gears. There are no slides which require to be moved during generation to carry the cutter and blank toward and from each other. Elimination of slide movements means a gain in accuracy, also.

The presence of a pair of eccentric or elliptical gears 20 and 22 in the gear train connecting the cutter and blank causes cutter and blank to rotate together at a varying velocity ratio. The variation in ratio of rotation of the cutter and blank combined with the bodily movement of the cutter toward and away from the blank operates to generate teeth 25 on the blank of substantial uniformity of size, shape and pressure angle around the periphery of the blank, for by properly proportioning the eccentricity of the gears 20 and 22, the angular velocity of the cutter relative to the blank can be made to vary substantially in the same way as if the pitch circle of the cutter teeth were to roll without slipping on a non-circular pitch curve of the gear, and the uniform tooth thickness and pressure angles of the cutter teeth is reproduced in the gear.

In the case of eccentrically mounted equal gears, which in mesh operate in a manner similar to elliptical gears, there are two "high" points and two "low" points around the circumference of the gear. To generate such gears, the number of teeth in the cutter must be half the number of teeth in the gear to be cut and the cutter and blank must be rotated at such relative velocities that the cutter makes two revolutions while the blank is making one, being thereby moved toward and from the blank twice during a revolution of the blank.

For cutting an eccentric or approximately elliptical gear, a typical train of gearing for rotating cutter and blank in timed relation would comprise gears 15 and 16 having tooth numbers in the ratio of 1:2, a gear 18 having the same number of teeth as gear 16, and eccentric gears 20 and 22 having equal number of teeth. The number of teeth in the cutter T would be, as stated, half the number of teeth to be cut in the blank G.

Figure 2:
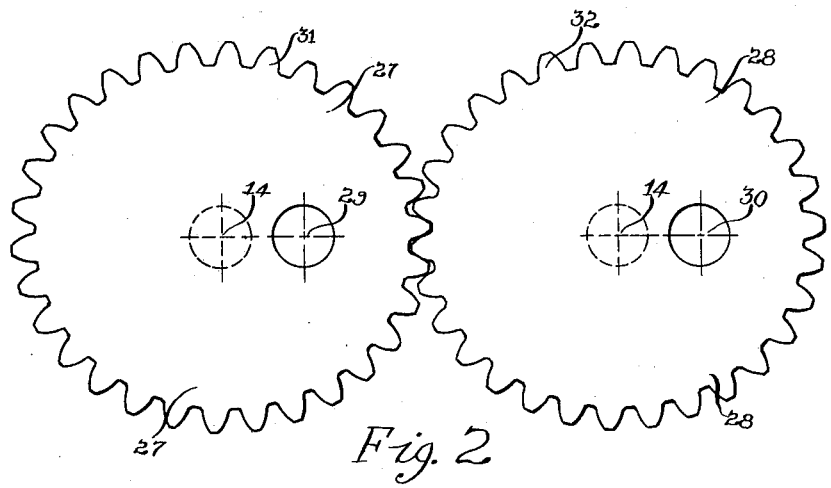
Figure 2 is a view showing a pair of gears cut according to the present invention in mesh.

In Figure 2, there is shown a pair of gears 27 and 28 generated according to the present invention. These are equal gears, that is, they are identical and they may be generated simultaneously with the same cutter by mounting the two blanks together upon the same arbor in the cutting machine. They are generated on centers 14 corresponding to their geometrical centers, but are mounted to run on axes 29 and 30, respectively, eccentric of their axes of generation. In cases where the axis of generation is but slightly offset from the axis of operation, the gears may be centrally bored for generation but mounted on eccentric bushings in use. Where the eccentricity of the axes of generation and operation are great, however, other means may be devised for mounting the gears, as will readily occur to those skilled in the art. As will be noted, the teeth 31 and 32 of the respective gears are approximately uniform in shape, size and pressure angle around the gears. There is no considerable change in tooth thickness or pressure angle at different points around the gears as was true of gears cut according to my previous method.

Figure 3:
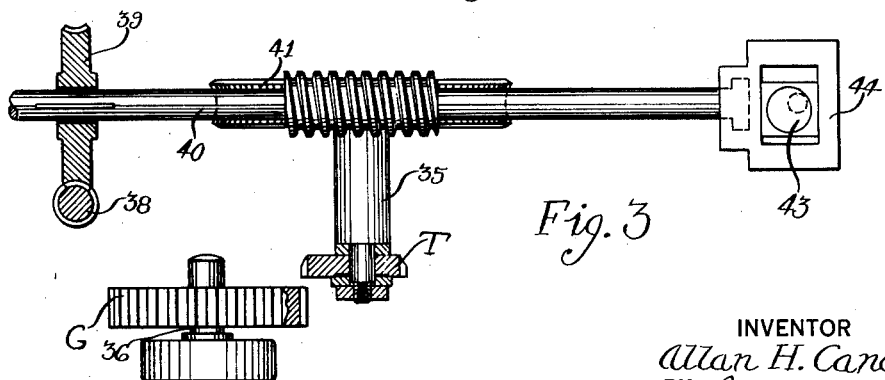
Figure 3 is a view more or less diagrammatic showing a typical arrangement of cutter and blank and a typical cutter drive for a machine built to practice the present invention.

A simplified train of gearing such as illustrated in Figure 1 might be used in a gear-cutting machine built to practice the present invention, but a more preferable arrangement is illustrated in Figure 3. This figure shows how a standard Gear Shaper may be modified to cut eccentric or elliptical gears according to the process of the present invention. T again designates the cutter. This may be a standard gear-shaper cutter but, as shown, is mounted eccentrically of the axis of the cutter spindle 35. To this end, the cutter may be provided with an eccentric bore. The blank G is secured to the work spindle 36 of the machine.

In the standard machine, the cutter spindle is rotated at a uniform velocity and may be driven, for instance, from a worm 38 through a worm wheel 39, a worm shaft 40 and a worm wheel 41, the latter having a splined connection with the cutter spindle 35 to permit the spindle to be reciprocated simultaneously with its rotation. In order to modify such a drive to cut gears according to the present invention the periodically varying velocity of rotation of the cutter relative to the blank is produced by providing an eccentric 43 which has a block and slot connection with a head 44 which is connected to one end of the shaft 40. The connection between the head 44 and the shaft 40 will be such as to allow rotation of the shaft with reference to the head while the shaft 40 will be connected to the worm gear 39, as, for instance, through a splined connection, so as to allow reciprocation of the shaft from the head 44 under actuation of the eccentric 43 while it is being rotated from the worm and worm wheel drive 38—39.

The eccentric 43 may be driven in any suitable way in time with the rotation of the work spindle and of the shaft 38. It will impart a reciprocating movement at a varying velocity of a harmonic nature to the shaft 40 which movement will combine with the uniform rotational movement imparted to the shaft 40 by the gearing 38—39 to drive the cutter spindle 35 at a varying velocity of a harmonic nature. Thus the cutter spindle will be driven at a varying velocity of a harmonic nature. The work spindle may be driven at a uniform velocity through a drive such as now employed in spur gear shapers and the work spindle and the shaft 38 can be connected together to rotate in timed relation through any suitable train of gearing.

While the invention has been illustrated in connection with particular embodiments, it will be understood that the invention is capable of various other modifications. In general, it may be said that the present application is intended to cover any adaptations, uses or embodiments of the invention following, in general, the principles of the invention and including such departures from the present disclosure as come within known or customary practice in the gear art and as may be applied to the essential features hereinbefore set forth and as fall within the scope of the invention or the limits of the appended claims.

I claim:

1. The method of generating a non-circular gear which comprises imparting a reciprocatory movement to a gear-shaped cutter while simultaneously rotating the cutter and blank together on fixed axes and at a varying velocity ratio, the cutter having teeth of uniform size and shape uniformly spaced about a common center eccentric of its axis of rotation.

2. The method of generating a non-circular gear which comprises engaging with a gear blank a gear-shaped cutter having a number of cutting teeth which is a factor of the number of teeth in the gear to be cut, said cutting teeth being of uniform shape and thickness and equally spaced about a common center, reciprocating said cutter axially and rotating the cutter at a varying velocity about an axis offset from said common center while rotating the blank on its axis at a uniform velocity, the velocity of cutter rotation being such that the cutter makes an integral number of revolutions while the blank is making one.

3. The method of generating a gear of approximately elliptical form which comprises engaging with a gear blank a gear-shaped cutter having a number of cutting teeth equal to half the number of teeth in the gear to be cut, said cutting teeth being of uniform shape and thickness and equally spaced about a common center, reciprocating said cutter axially and rotating the cutter at a varying velocity of a harmonic nature about an axis offset from its geometric center while rotating the blank on its axis at a uniform velocity.

4. In a machine for generating non-circular gears, a rotatable work spindle and a rotatable cutter spindle, the axes of which are fixed during generation, a gear-shaped cutter mounted on said cutter spindle with its geometric center offset from the axis of said spindle and having cutting teeth of uniform shape and thickness equally spaced about its geometric center, means for reciprocating the cutter spindle and means for simultaneously rotating the work and cutter spindles on their respective axes at a periodically varying relative velocity ratio.

5. In a machine for generating irregular gears, a rotatable work support, a gear shaped cutter having cutting teeth of uniform thickness and shape equally spaced about a common center, means for reciprocating said cutter axially, means for rotating the cutter at a varying velocity about an axis eccentric of its center, and means for rotating the work support simultaneously at a uniform velocity.

6. In a machine for generating irregular gears, a rotatable work support, a cutter spindle, a gear shaped cutter having a plurality of cutting teeth of uniform shape and thickness equally spaced about a common center and mounted on said spindle so that said center is eccentric of the axis of the spindle, means for rotating the work support and for simultaneously rotating and reciprocating said spindle, one of said rotational movements being at a varying velocity and said rotational movement being further timed so that the cutter makes an integral number of revolutions while the work support is making one revolution.

ALLAN H. CANDEE.